US008348528B2

(12) United States Patent
Masuzawa et al.

(10) Patent No.: US 8,348,528 B2
(45) Date of Patent: *Jan. 8, 2013

(54) BLADE DRIVE DEVICE

(75) Inventors: Koichi Masuzawa, Chiba (JP); Kenichi Kudo, Chiba (JP)

(73) Assignee: Seiko Precision Inc., Narashino-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/609,289

(22) Filed: Oct. 30, 2009

(65) Prior Publication Data

US 2010/0046938 A1 Feb. 25, 2010

Related U.S. Application Data

(63) Continuation of application No. PCT/JP2008/062858, filed on Jul. 16, 2008.

(30) Foreign Application Priority Data

Sep. 7, 2007 (JP) ................................. 2007-233365

(51) Int. Cl.
*G03B 9/00* (2006.01)
(52) U.S. Cl. ........................................................ 396/463
(58) Field of Classification Search .................. 396/463; 310/38
See application file for complete search history.

(56) References Cited

U.S. PATENT DOCUMENTS

| 2,792,510 | A | 5/1957 | Wolf |
| 4,262,223 | A | 4/1981 | Cleusix |
| 4,702,583 | A | 10/1987 | Yoshino |
| 4,777,394 | A * | 10/1988 | Hayashi ........................ 310/83 |
| 4,881,093 | A | 11/1989 | Dowe ......................... 354/234.1 |
| 5,150,149 | A | 9/1992 | Alligood |
| 5,757,108 | A | 5/1998 | Suzuki ........................... 310/49 |
| 5,832,319 | A | 11/1998 | Seo ................................. 396/90 |
| 6,166,470 | A | 12/2000 | Miyazawa et al. ............. 310/181 |
| 6,800,983 | B1 | 10/2004 | Iijima et al. .................... 310/254 |
| 7,133,277 | B2 * | 11/2006 | Ikari et al. ...................... 361/600 |
| 7,156,564 | B2 | 1/2007 | Watanabe et al. ............. 396/463 |
| 7,190,404 | B2 * | 3/2007 | Shinomiya .................... 348/374 |
| 7,333,723 | B2 * | 2/2008 | Sato ................................. 396/55 |
| 7,755,245 | B2 | 7/2010 | Prosdocimi ............. 310/216.49 |
| 7,800,276 | B2 * | 9/2010 | Purvines ....................... 310/266 |

(Continued)

FOREIGN PATENT DOCUMENTS

CN 1477437 2/2004

(Continued)

OTHER PUBLICATIONS machine translation of JP 2005-189579A.*

(Continued)

*Primary Examiner* — Clayton E Laballe
*Assistant Examiner* — Linda B Smith
(74) *Attorney, Agent, or Firm* — Kratz, Quintos & Hanson, LLP

(57) ABSTRACT

A blade drive device includes: a blade; a drive source that drives the blade; and a chassis that has an opening opened and closed by a driving of the blade, and that houses the blade and the drive source. The drive source includes: a rotor that is rotatably supported; and a stator around which a coil for excitation is wound and which applies a rotational force to the rotor. The stator is formed along an inner side surface of the chassis and has a rectangular shape.

8 Claims, 13 Drawing Sheets

U.S. PATENT DOCUMENTS

| | | | | |
|---|---|---|---|---|
| 2001/0033749 | A1* | 10/2001 | Yokoyama et al. | 396/535 |
| 2002/0067099 | A1 | 6/2002 | Nagasaka | 310/254 |
| 2004/0036798 | A1 | 2/2004 | Saito et al. | 348/363 |
| 2004/0046463 | A1 | 3/2004 | Takemoto et al. | |
| 2005/0058444 | A1 | 3/2005 | Watanabe et al. | 396/458 |
| 2005/0152063 | A1 | 7/2005 | Hara et al. | 360/126 |
| 2005/0152691 | A1* | 7/2005 | Kawauchi et al. | 396/463 |
| 2005/0207026 | A1 | 9/2005 | Satodate et al. | 359/696 |
| 2005/0286889 | A1 | 12/2005 | Kihara | 396/463 |
| 2006/0221269 | A1* | 10/2006 | Kawaguchi | 349/58 |
| 2007/0164640 | A1 | 7/2007 | Huang | 310/49 R |
| 2008/0062301 | A1* | 3/2008 | Zhou | 348/345 |
| 2008/0303369 | A1 | 12/2008 | Ionel et al. | 310/172 |
| 2009/0052886 | A1 | 2/2009 | Watanabe et al. | 396/486 |

FOREIGN PATENT DOCUMENTS

| | | | |
|---|---|---|---|
| CN | 1605923 | | 4/2005 |
| CN | 1637575 | A | 7/2005 |
| CN | 1734344 | | 2/2006 |
| JP | 52-077720 | | 6/1977 |
| JP | 62-127531 | | 8/1987 |
| JP | 02089033 | | 3/1990 |
| JP | 3-500933 | | 2/1991 |
| JP | 03-107832 | | 5/1991 |
| JP | 9-22042 | | 1/1997 |
| JP | 11-024125 | | 1/1999 |
| JP | 11-24125 | | 1/1999 |
| JP | 2001-103690 | | 4/2001 |
| JP | 2002-303914 | A1 | 10/2002 |
| JP | 2002-359998 | A1 | 12/2002 |
| JP | 2005-91549 | A1 | 4/2005 |
| JP | 2005-189579 | A1 | 7/2005 |
| JP | 2005189579 | A * | 7/2005 |
| JP | 2005-241957 | A1 | 9/2005 |
| JP | 2005-309276 | A1 | 11/2005 |
| JP | 2006-11293 | | 1/2006 |
| JP | 2006-242994 | | 9/2006 |
| JP | 2006-242994 | A1 | 9/2006 |
| JP | 2006242994 | A * | 9/2006 |
| JP | 2007-86547 | A1 | 4/2007 |
| JP | 2007-183372 | A1 | 7/2007 |

OTHER PUBLICATIONS machine translation of JP2006-242994A.*
machine translation of JP2005-091549A, Watabe et al., Balde Driving Device for Camera.*
International Search Report for International Application No. PCT/JP2008/062858 dated Aug. 26, 2008.
Communication from Chinese Patent Office dated Oct. 13, 2010 with English translation (11 pages).
Communication from the State Intellectual Property Office of China dated Dec. 27, 2010 with English translation (13 pages).
Communication from the State Intellectual Property Office of China dated Dec. 14, 2010 with English translation (12 pages).
Notification of Submission of Opinion issued by the Korean Intellectual Property Office dated May 30, 2011 on counterpart application No. 10-2009-7022439 with English translation (8 pages).
Notification of Reasons for Refusal issued by the Japanese Patent Office dated Oct. 25, 2011 received in counterpart application No. 2007-233366 with English translation (5 pages).
Notification of Reasons for Refusal issued by the Japanese Patent Office dated Oct. 25, 2011 received in counterpart application No. 2007-233367 with English translation (7 pages).
Chinese Office Action issued in a corresponding application mailed Apr. 19, 2011 with English translation (12 pages).
Notification of Submission of Opinion issued by the Korean Intellectual Property Office dated May 30, 2011 with English translation (8 pages).
Second Notification of Office Action issued by The State Intellectual Property Office of China dated Aug. 8, 2011 with English translation (6 pages).
Notification of Reasons for Refusal received on counterpart application No. 2007-233365 from the Japanese Patent Office dated Aug. 9, 2011 with English translation (10 pages).
Notification of Reasons for Refusal received on counterpart application No. 2007-233366 from the Japanese Patent Office dated Aug. 9, 2011 with English translation (6 pages).
Notification of Reasons for Refusal received on counterpart application No. 2007-233367 from the Japanese Patent Office dated Aug. 9, 2011 with English translation (9 pages).
Office Action received from the State Intellectual Property Office of China in counterpart application No. 200880105798.9 dated Aug. 9, 2011 with English translation (7 pages).
Korean Office Action issued for counterpart Korean Patent Application No. 10-2009-7022439 dated Apr. 26, 2012.
Korean Office Action issued for counterpart Korean Patent Application No. 10-2009-7021945 dated Apr. 26, 2012.
3$^{rd}$ Notification of Office Action issued by the State Intellectual Property Office of China dated May 2, 2012 received in counterpart application No. 200880103640.8 with English translation (12 pages).
Notification of Reasons for Refusal issued by the Japanese Patent Office dated Oct. 25, 2011 on counterpart application No. 2007-233365 with English translation (8 pages).
Chinese Office Action issued for counterpart Chinese Patent Application No. 200880105798.9 dated May 2, 2012, with English translation.
U.S. Appl. No. 12/609,293, filed Oct. 30, 2009, Masuzawa.
U.S. Appl. No. 12/576,642, filed Oct. 9, 2009, Masuzawa.
Korean Office Action issued for counterpart Korean Patent Application No. 10-2009-7021945 dated Aug. 27, 2012, with English translation.
Korean Office Action issued for counterpart Korean Patent Application No. 10-2009-7022439 dated Aug. 27, 2012, with English translation.

* cited by examiner

US 8,348,528 B2

BLADE DRIVE DEVICE

CROSS-REFERENCE TO RELATED APPLICATION

This application is a continuation of and claims priority to International Patent Application No. PCT/JP2008/062858 filed on Jul. 16, 2008, which claims priority to Japanese Patent Application No. 2007-233365 filed on Sep. 7, 2007, subject matter of these patent documents is incorporated by reference herein in its entirety.

BACKGROUND OF THE INVENTION

1. Field of the Invention

The present invention relates to blade drive devices.

2. Description of the Related Art

Generally, a blade drive device for a camera includes: a board having an opening; a blade opening and closing the opening; and a drive source, such as an actuator, driving the blade (see Japanese Unexamined Patent Application Publication No. 2007-183372).

Such a blade drive device is often installed into a small device such as a mobile phone, and there is a demand for further downsizing the blade drive device. There is a demand not only for downsizing the blade drive device in a planar direction perpendicular to an optical axis but also for reducing the thickness in the optical axis direction.

However, since such a blade drive device includes various members such as a blade, a base board, and the like, made of synthetic resins, when reduced too much in thickness, each member is bended with ease. This may degrade handling ability of the blade drive device when it is assembled or installed into an external apparatus after its fabrication is completed. When the thickness of each member is increased, each member can be suppressed from bending, but the thickness of the blade drive device is increased, and thus the demand for reducing the thickness cannot be achieved.

SUMMARY OF THE INVENTION

It is therefore an object of the present invention to provide a blade drive device which has an improved handling ability and a reduced thickness.

According to an aspect of the present invention, there is provided a blade drive device including: a blade; a drive source that drives the blade; and a chassis that has an opening opened and closed by the blade, and that houses the blade and the drive source, the drive source comprising: a rotor that is rotatably supported; and a stator around which a coil for excitation is wound and which applies a rotational force to the rotor, the stator being formed along an inner side surface of the chassis and having a rectangular shape.

DESCRIPTION OF THE PREFERRED EMBODIMENT

A description will be given of embodiments according to the present invention with reference to the drawings.

[First Embodiment]

Figure 1:
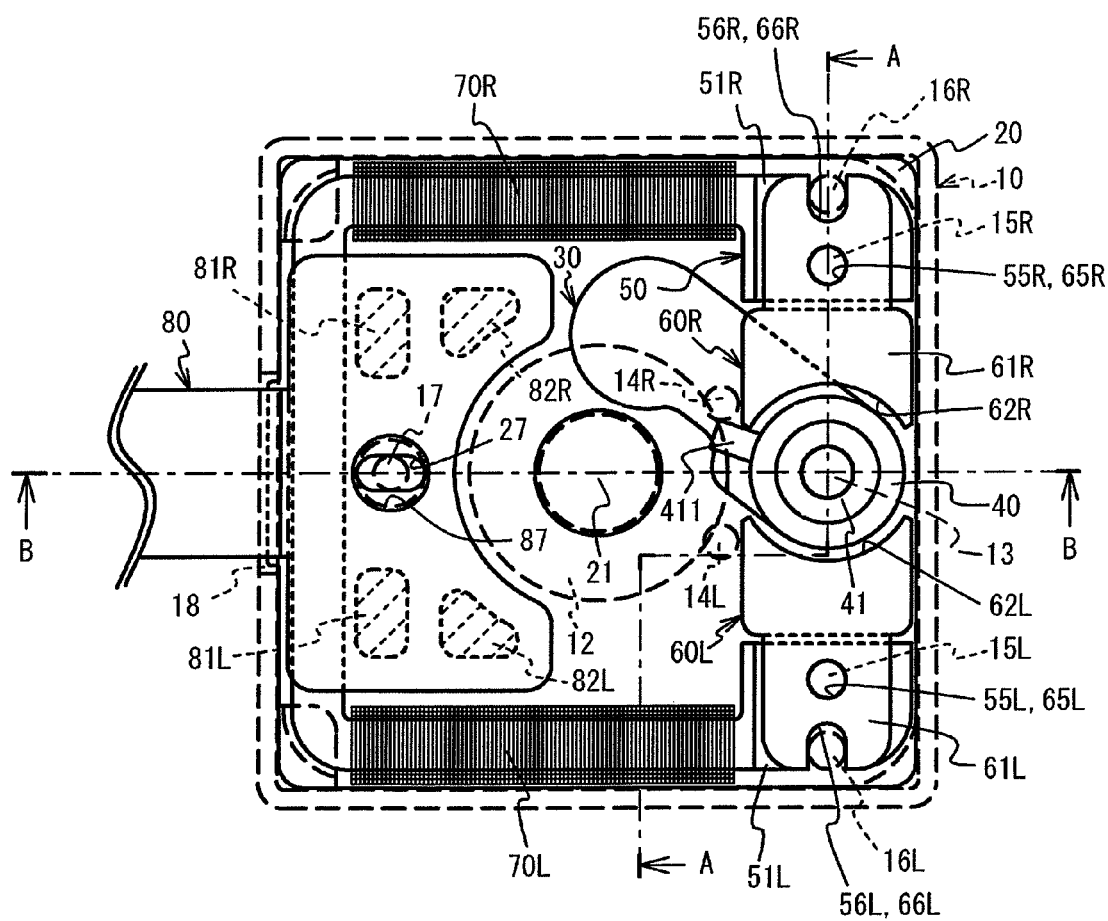
FIG. 1 is a front view of a configuration of a blade drive device according to a first embodiment.
Figure 2:
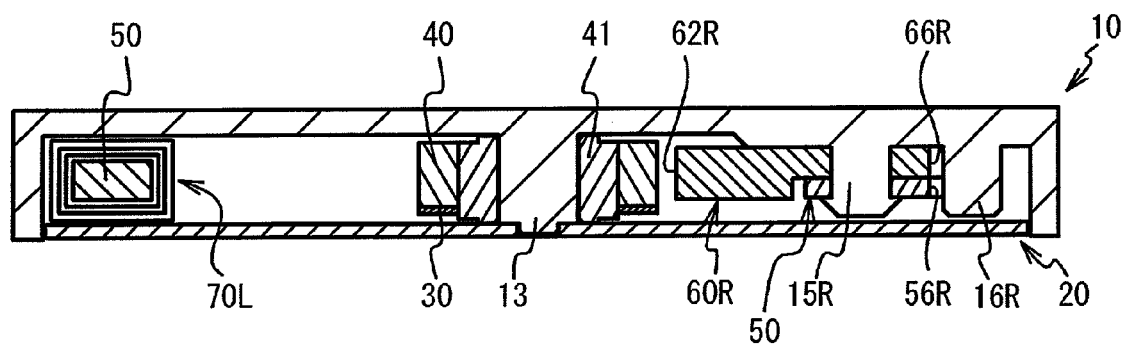
FIG. 2 is a cross-sectional view taken along a line A-A in FIG. 1.
Figure 3:
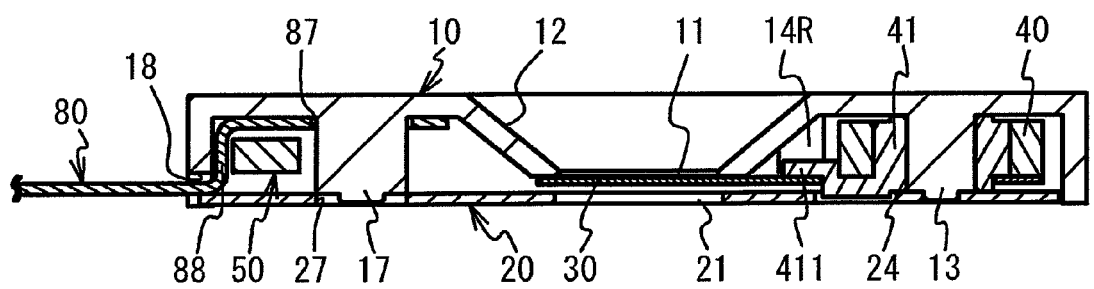
FIG. 3 is a cross-sectional view taken along a line B-B in FIG. 1.
Figure 4:
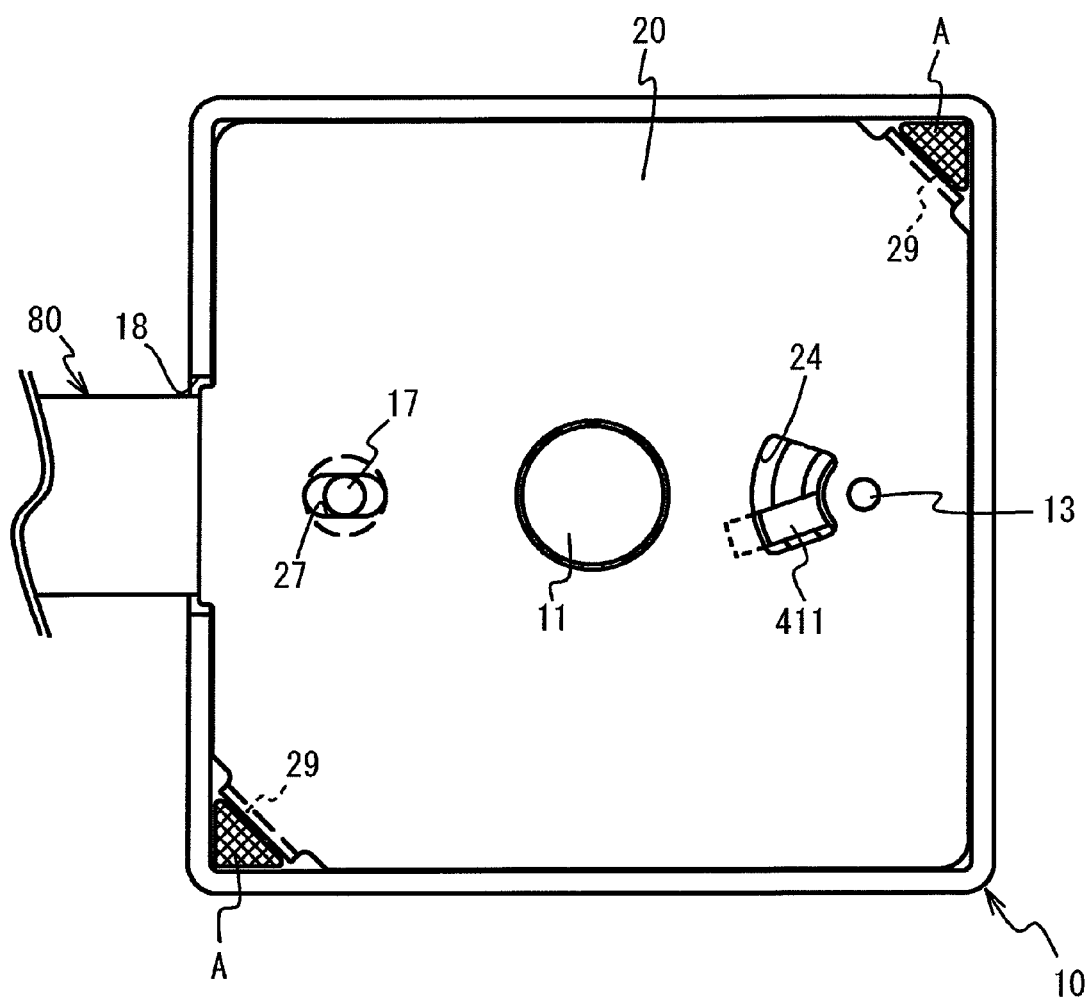
FIG. 4 is a rear view of a blade drive device according to the first embodiment.

FIG. 1 is a front view of a configuration of a blade drive device according to a first embodiment. FIG. 2 is a cross-sectional view taken along a line A-A in FIG. 1. FIG. 3 is a cross-sectional view taken along a line B-B in FIG. 1. FIG. 4 is a rear view of a blade drive device according to the first embodiment. The blade drive device according to the first embodiment includes: an upper case 10; a lower case 20; a blade 30; a rotor 40; iron pieces 50, 60L, and 60R; coils 70L and 70R; and a flexible printed circuit board 80.

The upper and lower cases 10 and 20 serve as a chassis that houses the blade 30, the rotor 40, the iron pieces 50, 60L, and 60R, and a part of the flexible printed circuit board 80, as illustrated in FIGS. 2 and 3. The upper and lower cases 10 and 20 are made of a synthetic resin. The upper case 10 is thicker than the lower case 20. The blade drive device according to the first embodiment is attachable to an image pickup apparatus or a lens drive apparatus so that the upper case 10 faces the object side and the lower case 20 faces an image pickup element such as a CCD. The upper and lower cases 10 and 20 are respectively provided with openings 11 and 21 for shooting. A slope portion 12 is provided around the opening 11, as illustrated in FIG. 3. Additionally, the upper case 10 is indicated by a broken line in FIG. 1.

The blade 30 is made of a synthetic resin. The blade 30 is supported to open and close the openings 11 and 21. The blade 30 swings together with the rotor 40. The blade 30 illustrated in FIG. 1 is positioned at a receded position, which is receded from the openings 11 and 21, and is causing the openings 11 and 21 to be fully opened.

The rotor 40 is magnetized with differential magnetic poles in the circumferential direction, and is rotatably supported within the upper and lower cases 10 and 20 serving as a chassis. The rotor 40 has a cylindrical shape. A stopper member 41 is fitted into an inner circumference of the rotor 40. Thus, the rotor 40 rotates in conjunction with the stopper member 41.

The stopper member 41 has a substantially cylindrical shape made of a synthetic resin. The inner circumference of the stopper member 41 is slidably engaged with a rotor supporting shaft 13 extending in the optical path direction, from the upper case 10. In this manner, the rotor 40 is rotatably supported. As illustrated in FIG. 3, the stopper member 41 is provided with a pin portion 411 extending radially outward from a bottom of the stopper member 41. The pin portion 411 extends radially outward beyond the outer circumferential surface of the rotor 40. Additionally, the blade 30 is engaged with the bottom portion of the stopper member 41. The rotation of the stopper member 41 allows the blade 30 to swing about the rotor supporting shaft 13. Therefore, the rotation of the rotor 40 swings the blade 30 to open and close the openings 11 and 21. Additionally, the upper case 10 is provided with restricting pins 14L and 14R contactable with the pin portion 411, as illustrated in FIGS. 1 and 3. By causing the pin portion 411 to be contact with the restricting pins 14L and 14R, the rotational range of the rotor 40 is restricted. Thus, the swinging range of the blade 30 is also restricted. Further, the lower case 20 is provided with a releasing hole 24 for receiving the thickness of the pin portion 411, as illustrated in FIG. 4. Furthermore, the rotor supporting shaft 13 is engaged with an engagement hole provided in the lower case 20.

The iron pieces 50, 60L, and 60R are arranged along the inner side surfaces of the upper and lower cases 10 and 20. The iron pieces 50, 60L, and 60R surround a substantially entire periphery of the openings 11 and 21 except for the rotor 40. The iron pieces 50, 60L, and 60R are connected to one another. The iron piece 50 has a substantially lateral U shape, as illustrated in FIG. 1. The iron pieces 60L and 60R are respectively connected to end portions of the iron piece 50, as illustrated in FIGS. 1 and 2. The iron pieces 60L and 60R are respectively provided with magnetic poles 62L and 62R facing the outer circumferential surface of the rotor 40. Specifically the iron pieces 60L and 60R are connected to end portions of two opposed sides of the iron piece 50, and then orthogonally arranged to the two opposed sides. The iron pieces 60L and 60R are arranged to face each other. In addition, the iron piece 60L is omitted in FIG. 2.

The iron piece 50 has right-and-left arm portions around which coils 70L and 70R are respectively wound. The coils 70L and 70R are provided for exciting the iron pieces 50, 60L, and 60R. The magnetic poles 62L and 62R are excited to be different poles by energization of the coils 70L and 70R, effecting a magnetically attractive force or magnetically repulsive force on the rotor 40. Therefore, the rotational force is given on the rotor 40. In other words, the iron pieces 50, 60L, and 60R entirely serve as a stator giving the rotational force to the rotor 40. Accordingly, the rotor 40, the iron pieces 50, 60L, and 60R, and the coils 70L and 70R serve as an actuator, which is a drive source driving the blade 30.

Additionally, all of the iron pieces 50, 60L, and 60R are arranged in a substantially rectangular shape when viewed in the optical path direction. Accordingly, the upper and lower cases 10 and 20 each are formed in a rectangular shape when viewed in the optical path direction. The blade 30 is arranged at such a position as to be surrounded by the iron pieces 50, 60L, and 60R. Further, each of the iron pieces 50, 60L, and 60R has a flat shape in the optical axis direction. Furthermore, the coils 70L and 70R are wound around the iron piece 50, whereas the coil is not wound around the iron pieces 60L and 60R. The iron pieces 60L and 60R each has an identical shape.

As illustrated in FIGS. 1, 3, and 4, a flexible printed circuit board 80 (hereinafter referred to as a FPC) is inserted into the upper and lower cases 10 and 20. The FPC 80 has flexibility. The FPC 80 is provided with solder lands 81L, 81R, 82L, and 82R for energizing the coils 70L and 70R at its surface facing the lower case 20. The both ends of the coil 70L are respectively connected to the solder lands 81L and 82L. Similarly, the both ends of the coil 70R are respectively connected to the solder lands 81R and 82R. The solder lands 81L, 81R, 82L, and 82R are housed within the upper and lower cases 10 and 20 serving as a chassis, and are surrounded by the iron pieces 50, 60L, and 60R. The FPC 80 is provided with an attachment hole 87. As illustrated in FIGS. 1 and 3, a supporting pin 17 formed in the upper case 10 is inserted into the attachment hole 87. Further, the supporting pin 17 is engaged with an engagement hole 27, as illustrated in FIGS. 3 and 4. Therefore, the supporting pin 17 functions to connect with the engagement hole 27, and also functions to fix the FPC 80 at a given position.

Additionally, as illustrated in FIG. 3, the FPC 80 is inserted into the upper and lower cases 10 and 20 via an insert hole 18 formed in the upper case 10. The FPC 80 is fixed along the inner surface of the upper case 10, via a carve portion 88 before reaching the iron piece 50.

Figure 5:
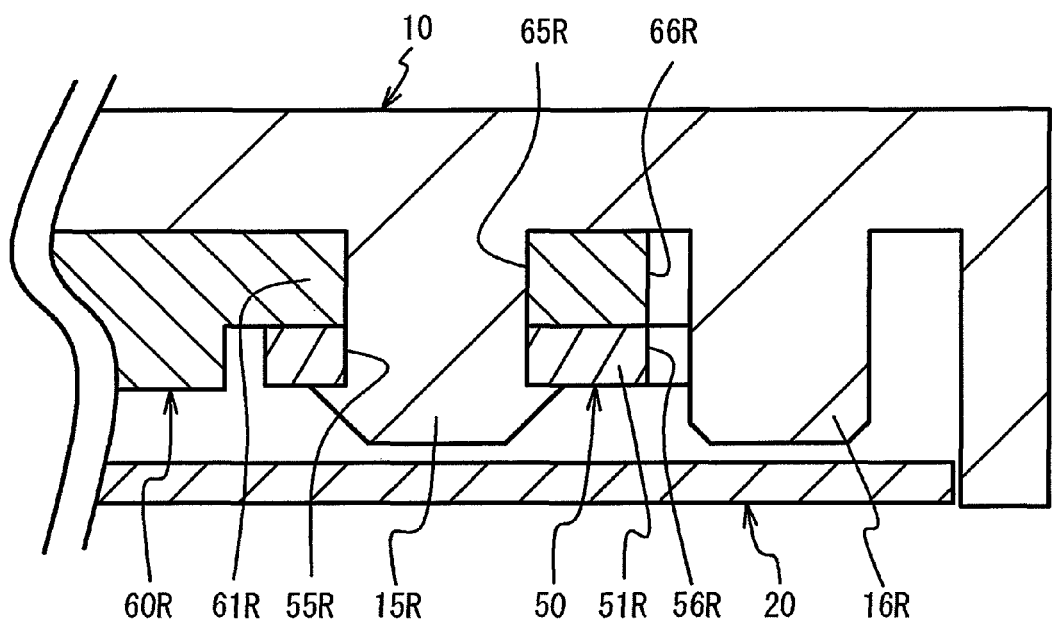
FIG. 5 is an enlarged view of a connecting portion of iron pieces, as illustrated in FIG. 2.

Next, a description will be given of the iron pieces 50, 60L, and 60R. FIG. 5 is an enlarged view of a connecting portion of the iron pieces 50 and 60R, as illustrated in FIG. 2. As illustrated in FIG. 5, at the connecting portion of the iron pieces 60R and 50, thin portions 51R and 61R are in contact with each other. The thin portions 51R and 61R are thinner than another portion of the iron pieces 50 and 60R, respectively. In addition, the thin portions 51R and 61R are respectively formed with fitting holes 55R and 65R. A fixing pin 15R, which is formed in the upper case 10, is inserted into the fitting holes 55R and 65R. Further, an end portion of the fixing pin 15R is pressure bonded with a bottom edge surface of the iron pieces 50R by thermal caulking, whereby the thin portions 51R and 61R are in pressure contact with each other. This configuration also applies to the fitting holes 55L and 65L, and a fixing pin 15L.

Furthermore, as illustrated in FIG. 5, the upper case 10 is provided with an engagement pin 16R adjacent to the fixing pin 15R. The engagement pin 16R is engaged with engagement recess portions 56R and 66R, which are respectively provided in the thin portions 51R and 61R. Unlike the fitting holes 55R and 65R, the engagement recess portions 56R and 66R are cut out at peripheral surfaces of the iron pieces 50 and 60R in the optical axis direction. This configuration also applies to an engagement pin 16L, and engagement recess portions 56L and 66L.

Figure 6:
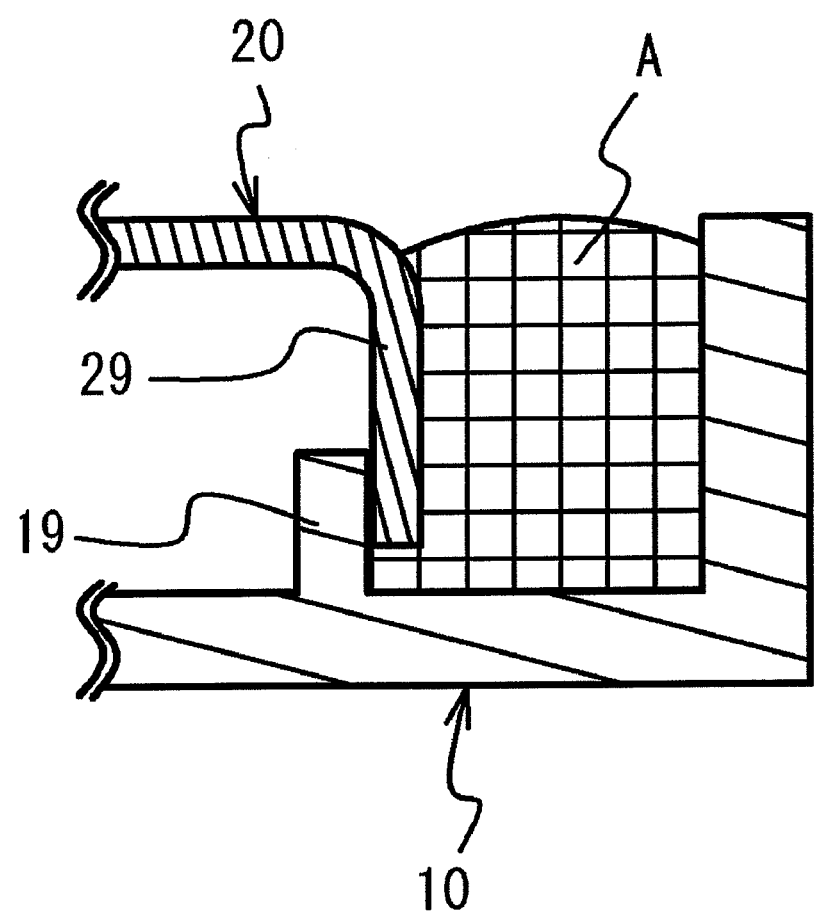
FIG. 6 is a cross-sectional view of a filling portion.

Furthermore, as illustrated in FIG. 4, filling portions which are filled with adhesive materials A are provided at two corner portions on a diagonal line of the upper and lower cases 10 and 20. FIG. 6 is a cross-sectional view of the filling portion. As illustrated in FIGS. 4 and 6, the filling portion is defined by an embankment portion 19, a bending portion 29, and an inner peripheral surface of the corner portion of the upper case 10. The embankment portion 19, having a projective shape, is raised toward the lower case 20 from the upper case 10. The bending portion 29 is carved toward the upper case 10 at an outer edge portion of the lower case 20. The upper and lower cases 10 and 20 are fixed by the adhesive material a filled in the filling portions.

Next, a brief description will be given of an assembling method of the blade drive device according to the first embodiment. Firstly, the rotor 40, the stopper member 41, and the blade 30 are integrated with the inner side of the upper case 10 facing upwardly and are then engaged with the rotor supporting shaft 13. Next, the iron piece 60R is arranged inside of the upper case 10 so as to respectively engage the fixing pin 15R and the engagement pin 16R with the fitting hole 65R and the engagement recess portion 66R. In the same manner, the iron piece 60L is also arranged. In addition, the iron piece 60R is attached such that the fixing pin 15R and the engagement pin 16R are engaged with the fitting hole 65R and the engagement recess portion 66R respectively at the same time. The engagement pin 16R serves to prevent the iron piece 60R from rotating about the fixing pin 15R. Therefore, the iron piece 60R is positioned relative to the upper case 10.

Herein, the iron piece 60R may be attached such that the fixing pin 15R and the engagement pin 16R are in pressure contact with each other. In this case, the iron piece 60R having a desirable clearance with respect to the rotor 40 can be securely fixed to the upper case 10. The fitting hole 65L and the engagement recess portion 66L of the iron piece 60L, and the fixing pin 15L and the engagement pin 16L are provided in the same manner as the above arrangements.

Next, the FPC 80 is attached into the upper case 10 such that the solder land 81 or the like faces the inside of the upper case 10 and the supporting pin 17 is fitted into the attachment hole 87. Then, the iron piece 50 wound with the coils 70L and 70R is attached to the inner periphery of the upper case 10 such that the fixing pins 15L and 15R are respectively fitted into the fitting holes 55L and 55R, and the engagement pins 16L and 16R are respectively engaged with the engagement recess portions 56L and 56R. In this case, the iron piece 50 is attached to the upper case 10 such that the thin portion 51R of the iron piece 50 and the thin portion 61R are overlapped, and the thin portions 51L and 61R are overlapped. Next, the end portions of the fixing pins 15L and 15R are melted by thermal caulking, so the end portions of the fixing pins 15L and 15R and the outer surface of the iron piece 50 are welded. Further, in order to further securely fix the iron piece 50 to the upper case 10, the end portions of the engagement pins 16L and 16R may be melted by thermal caulking so as to weld with the outer surface of iron piece 50. Next, the lower case 20 is assembled into the upper case 10 such that the supporting pin 17 is engaged with the engagement hole 27 and that the rotor supporting shaft 13 is engaged with an engaging hole according to the rotor supporting shaft 13. Then, the adhesive material A is filled into the filling portion to bond the upper and lower cases 10 and 20. As mentioned above, the blade drive device according to the first embodiment is assembled.

Next, a description will be mainly given of a structure for improving handling ability and for maintaining the reduced thickness in the optical axis direction, according to the first embodiment of the blade drive device. A conventional blade drive device includes: a base plate having an opening; a blade, and an actuator for driving the blade. The actuator is typically arranged on an edge portion, of the base plate, receded away from the opening. Thus, a stator is also arranged on the edge portion of the base plate. In a case where the stator is arranged in such a manner, since the base plate is exposed from the outer periphery of the blade drive device and the base plate is typically formed into a thin shape, the base plate may be bended depending on the handling thereof when the blade drive device is assembled or when the assembled blade drive device is installed into an image pickup apparatus or a lens drive apparatus.

However, in the blade drive device according to the present embodiment, as mentioned above, the iron pieces 50, 60L, and 60R serving as the stator are integrated, and are formed along the inner side surfaces of the upper and lower cases 10 and 20. Therefore, even when the blade drive device is tightly held at its outer periphery, the upper and lower cases 10 and 20 are hardly bent. Accordingly, the handling ability is improved when the blade drive device is assembled and the blade drive device is installed into the mobile phone or the like.

Further, since the iron pieces 50, 60L, and 60R are integrated and are shaped along the inner peripheries of the upper and lower cases 10 and 20, the operation of the blade 30 is ensured even when an impact is applied to the blade drive device from its external. Therefore, the impact resistance is improved. In particular, when the impact is applied to the side of the blade drive device, the impact resistance is improved.

Further, the optical axis direction thickness of the upper and lower cases 10 and 20, which serve as the chassis, corresponds to the thicknesses of the coils 70L and 70R, as illustrated in FIG. 2. Typically, the coil for exciting the stator is thicker than any other parts in the blade drive device. Therefore, the thickness of the upper and lower cases 10 and 20 corresponds to the thicknesses of the coils 70L and 70R, thereby improving the handling ability and maintaining the reduced thickness in the optical axis direction.

Additionally, as illustrated in FIG. 1, the solder lands 81R, 81L, 82R, and 82L provided in the FPC 80 are housed within the upper and lower cases 10 and 20, and are surrounded by the iron pieces 50, 60L, and 60R. With such a configuration, when the blade drive device is assembled, the coil break due to deflecting of the blade drive device can be prevented, and the handling ability is improved. Further, the FPC 80 is inserted into the upper and lower cases 10 and 20 via these side surfaces, thereby maintaining the reduced thickness of the blade drive device in the optical axis direction. In addition, the conventional blade drive device includes a drive pin, which is attached to the rotor, which protrudes outwardly, and which bends downwardly in the optical axis direction. Such a drive pin is engaged with an engagement hole formed on a blade to drive the blade. In this manner, the drive pin bends downwardly in the optical axis direction. This is one of factors that increase the thickness of the conventional blade drive device in the optical axis direction. However, in the blade drive device according to the first embodiment, since the blade 30 is attached to the rotor 40, as illustrated in FIG. 3, the reduced thickness can be maintained in the optical axis direction. Furthermore, this eliminates the drive pin for transmitting the driving force from the rotor to the blade, thereby decreasing the number of the parts.

In addition, the blade 30 is directly fixed to the stopper member 41, as illustrated in FIG. 3. In the present embodiment, the blade 30 and the stopper member 41 are separately provided. However the blade 30 and the stopper member 41 may be integrated. Therefore, the number of the parts can be further reduced. In addition, in the present embodiment, the rotor supporting shaft 13, which serves as a spindle for supporting the rotation of the rotor 40, is integrally formed in the upper case 10. However, the invention is not limited to this configuration. For example, a rotor shaft which rotates in conjunction with the rotor may be employed. In this case, the blade 30 may be directly fixed to the rotor shaft, or the blade 30 may be integrally formed with the rotor shaft.

Returning to FIG. 6, the filling portions, for filing the adhesive material A for fixing the upper and lower cases 10 and 20, are provided in the upper and lower cases 10 and 20. In this manner, the upper and lower cases 10 and 20 are fixed by the adhesive material A. In the conventional blade drive device, a projection, which is projected in the optical axis direction, is formed in one of the upper and lower cases 10 and 20. A fitting hole, which is fitted with the projection, is formed in the other of the upper and lower cases 10 and 20. The end portion of the projection, which is fitted into the fitting hole, is welded by thermal caulking, thus the both are fixed. In this manner, the fixation by thermal caulking causes the end portion of the projection to be slightly melted. This is one of factors that increase the thickness in the optical axis direction. However, as the blade drive device according to the present embodiment, the upper and lower cases 10 and 20 are fixed by an adhesive material, the reduced thickness can be maintained in the optical axis direction.

Figure 7:
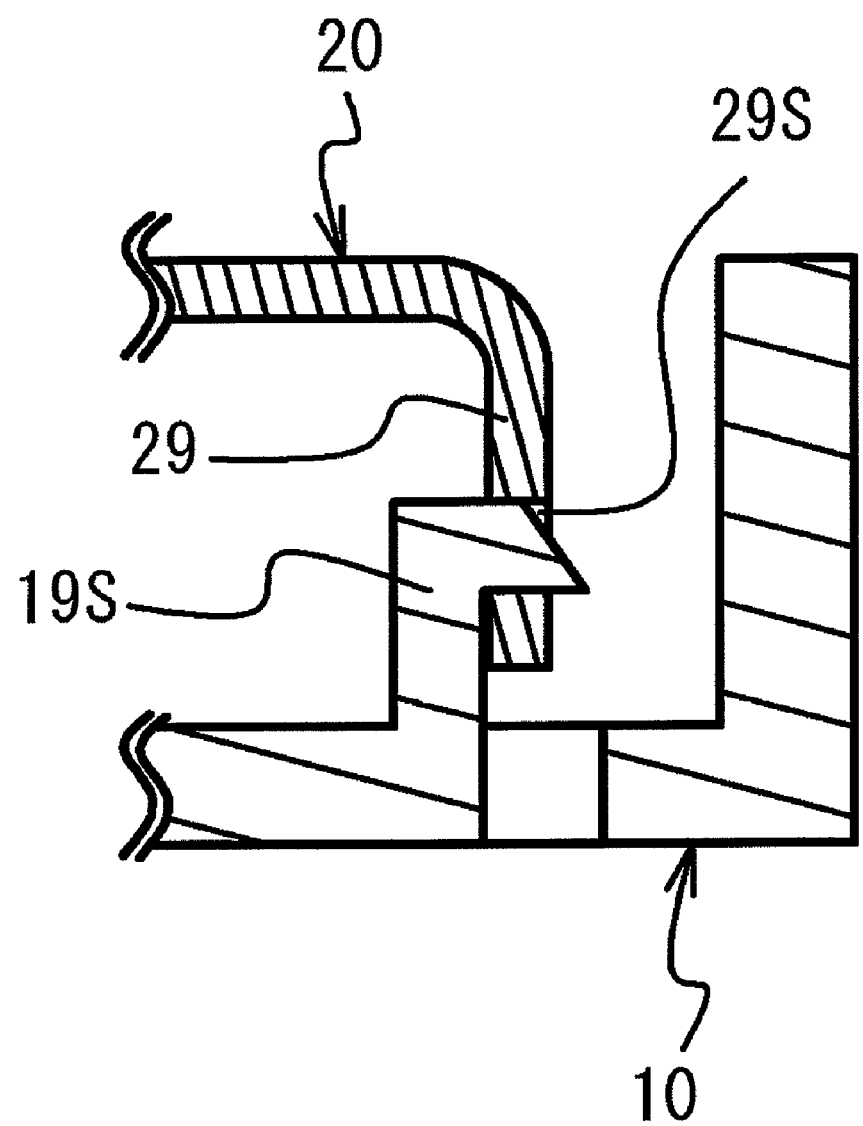
FIG. 7 is an exemplary cross-sectional view of a snap fitting structure.

Further, although the upper and lower cases 10 and 20 are fixed by the adhesive material, the present invention may employ another configuration. For example, the upper and lower cases 10 and 20 may be fixed by snap fitting. FIG. 7 is an exemplary cross-sectional view of a snap fitting structure. As illustrated in FIG. 7, the upper and lower cases 10 and 20 may be respectively provided with an engagement piece 19s and an engagement hole 29s corresponding to each other such that the engagement piece 19s and the engagement hole 29s do not exceed the thickness in the optical axis direction when the upper and lower cases 10 and 20 are assembled. In this case, the space where the adhesive material is filled is unnecessary, thereby maintaining the reduced thickness in the optical axis direction and also reducing the size in the planar direction perpendicular to the optical axis direction.

Additionally, since the iron pieces 50, 60L, and 60R, serving as the stator, have flat shapes in the optical axis direction, as illustrated in FIGS. 2 and 3, the reduced thickness can be maintained in the optical axis direction. In particular, as illustrated in FIG. 5, in the connecting portion of the iron piece 50 and the iron pieces 60L and 60R, the thin portions 51L and 51R of the iron piece 50 are respectively overlapped with the thin portions 61L and 61R in the optical axis direction, when the iron pieces 60L and 60R are connected to the iron piece 50. Therefore, the reduced thickness can be maintained in the optical axis direction.

As mentioned above, each of the upper and lower cases 10 and 20 has a rectangular shape as seen in the optical axis direction, and the iron pieces 50, 60L, and 60R are arranged to have a rectangular shape, as seen in the optical axis direction so as to correspond to the shapes of the upper and lower cases 10 and 20. With such a configuration, in the case where the rectangular shape is formed, the area where the solder lands 81R, 81L, 82R, and 82L are formed is ensured widely, as compared with a case where a circular shape is formed as seen in the optical axis direction. Therefore, the space for arranging components can be effectively used. Further, the handling is facilitated after the assembly is finished.

Next, a description will be given a structure for positioning and fixing the drive source relative to the upper case 10. As illustrated in FIGS. 1 and 2, the iron pieces 50, 60L, and 60R serving as the stator are fitted onto the fixing pins 15R and 15L and the engagement pins 16R and 16L so as to be positioned and fixed. Conventionally, the outer periphery of the stator is in pressure contact with positioning pins provided on a board to position and fix the stator. However, when such positioning pins, which are in pressure contact with the outer periphery of the stator, are provided on the board or the like, the size cannot be reduced in the planar direction perpendicular to the optical axis direction. In the blade drive device according to the first embodiment, the fitting hole 55R or the likes, which fitted onto the fixing pin 15R or the like, is provided in the iron piece 50 or 60R. Therefore, the pins, which come into contact with the periphery of the stator, can be eliminated, thereby reducing the size of the upper and lower cases 10 and 20 in the planar direction. Accordingly, the size of the blade drive device can be reduced in the planar direction.

Further, as illustrated in FIG. 2, the end portion of the fixing pin 15R is thermally caulked. This securely fixes the iron pieces 50 and 60R on the upper case 10. In addition, since the fixing pin 15R is fitted into the fitting hole 55R of the iron piece 50 and the fitting hole 65R of the iron piece 60R, even when the stator is composed of plural iron pieces, the increase in the number of the parts can be prevented, and the size can be reduced in the planar direction.

Next, regarding the blade drive device according to the first embodiment, a description will be given of a structure for improving the shutter speed while the smaller size is maintained.

As mentioned above, the iron pieces 50, 60L, and 60R are connected to each other and arranged to surround substantially the entire peripheries of the openings 11 and 21. With such an arrangement, the total length of the iron pieces 50, 60L, and 60R serving as the stator can be ensured, and the number of the turns of the coils 70L and 70R can be increased. Therefore, the output power of the rotor 40 is increased and the shutter speed becomes faster. In addition, the iron pieces 50, 60L, and 60R are arranged to surround the substantially entire peripheries of the openings 11 and 21, thereby maintaining the small size of the entire iron pieces 50, 60L, and 60R in the planar direction perpendicular to the optical axis direction.

In addition, the iron pieces 50, 60L, and 60R are formed into a substantially rectangular shape as a whole, thus making its linear portion as long as possible. It is therefore possible to wind the coils 70L and 70R in a great number of turns around the linear portion where the winding is made easy. Moreover, the coils 70L and 70R are wound respectively around two opposed sides of the iron piece 50, thereby increasing the number of the turns of the coil. Also, the rotor 40 is located at a center portion of one side of the rectangle. When the rotor 40 is located at such a position, it is suitable for the coils 70L and 70R are suited to be respectively wound around two opposing sides of the iron piece 50.

In addition, when the stator is integrally formed as the conventional stator and is formed into a complicated shape such that the openings 11 and 21 are surrounded as the blade drive device according to the present embodiment, the winding of the coil around the stator may become difficult. However, the stator, which is employed in the blade drive device according to the present embodiment, is composed of the iron pieces 50, 60L, and 60R which are connected, as mentioned above. Therefore, the coils 70L and 70R are wound around the iron piece 50 before the iron pieces 50, 60L, and 60R are connected, and then they are connected, thereby improving the winding workability.

[Second Embodiment]

Next, a description will be given of a blade drive device according to a second embodiment with reference to the drawings. Additionally, in the blade drive device according to the second embodiment, components that are similar to those of the first embodiment will be denoted by the same reference numerals as used in connection with the first embodiment, and a detailed description of such components will be omitted.

Figure 8:
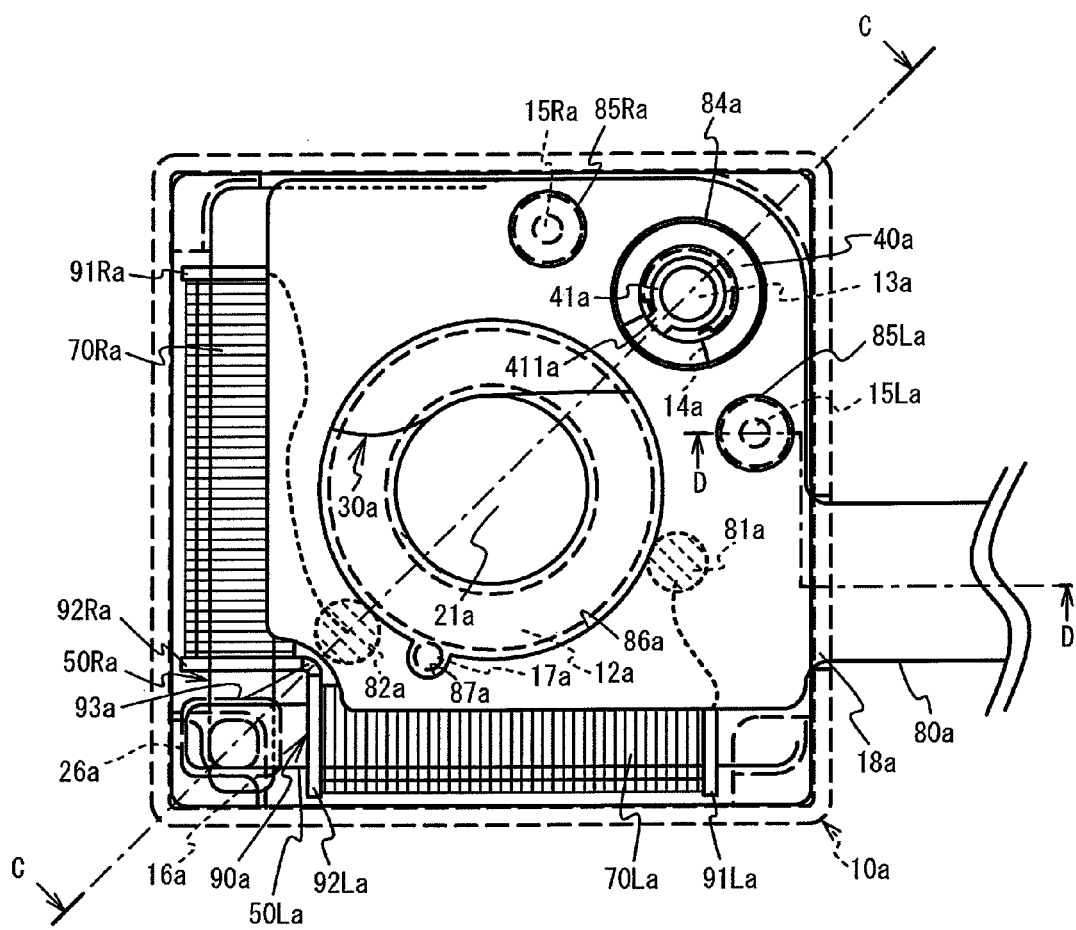
FIG. 8 is a front view of a configuration of a blade drive device according to a second embodiment.
Figure 9:
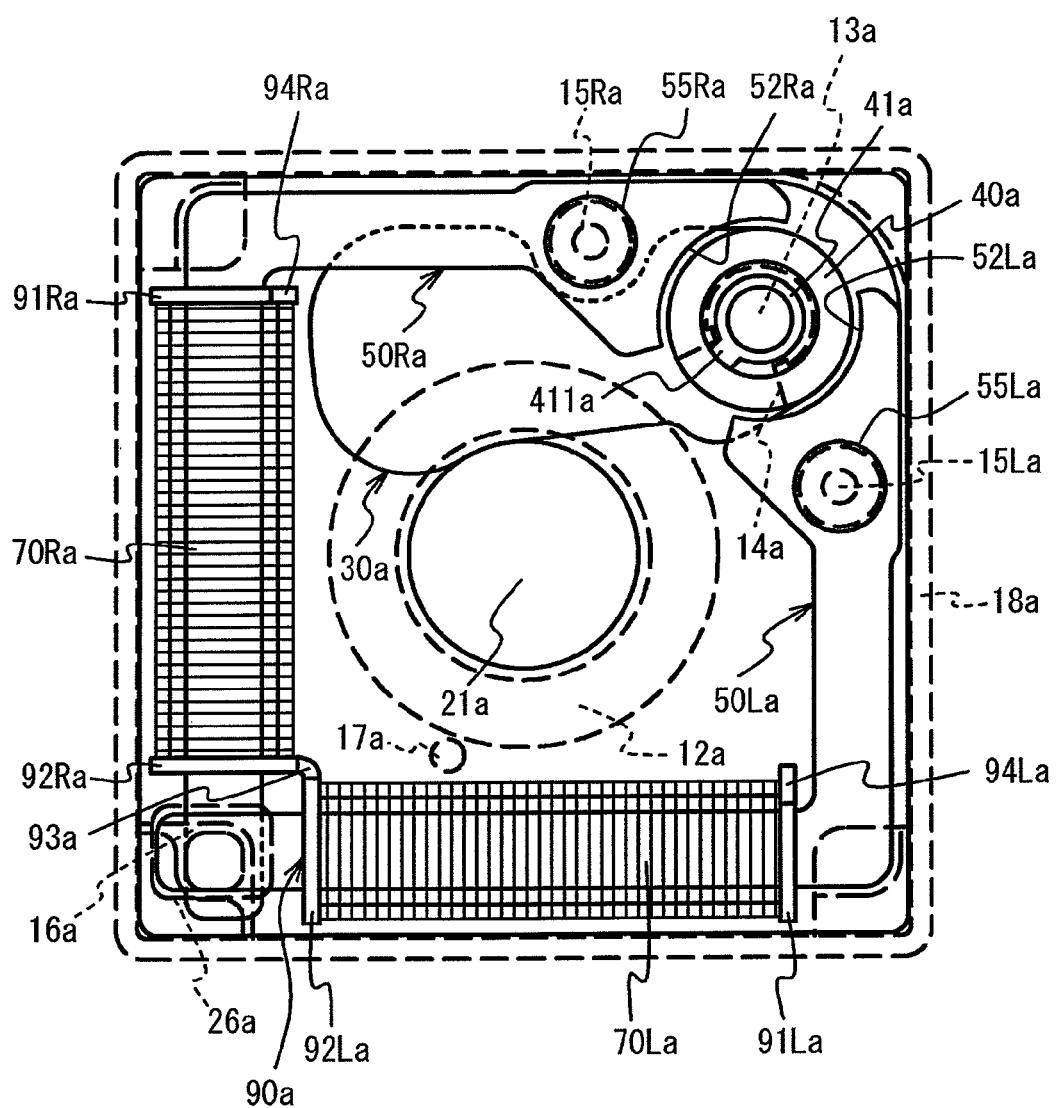
FIG. 9 is a front view of the blade drive device according to the second embodiment with a flexible print substrate being omitted.
Figure 10:
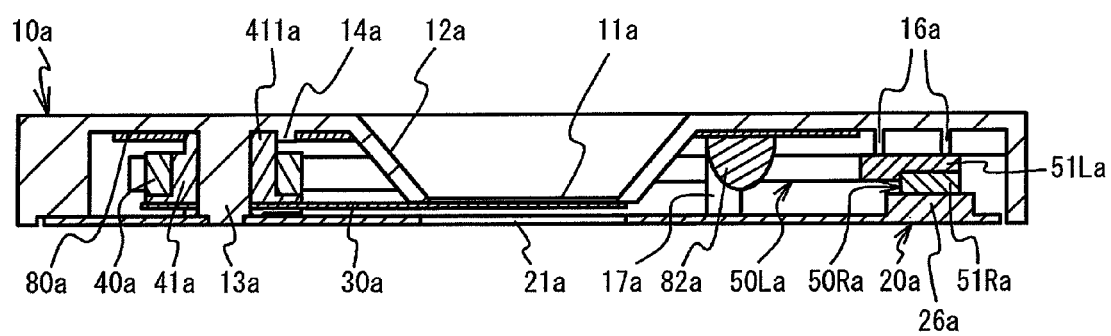
FIG. 10 is a cross-sectional view taken along a line C-C in FIG. 8.

FIG. 8 is a front view of a configuration of the blade drive device according to the second embodiment. FIG. 9 is a front view of the blade drive device according to the second embodiment with a flexible print substrate being omitted. FIG. 10 is a cross-sectional view taken along a line C-C in FIG. 8.

As illustrated in FIGS. 8 and 9, a rotor 40a is located at a corner portion of upper and lower cases 10a and 20a each has a rectangular shape as seen in the optical axis direction. Additionally, iron pieces 50La and 50Ra serve as a stator and each has an identical L shape. The iron pieces 50La and 50Ra are arranged to be a rectangular shape, to surround the periphery of openings 11a and 21a, and to be along inner side surfaces of the upper and lower cases 10a and 20a. One ends of the iron pieces 50La and 50Ra are respectively provided with magnetic poles 52La and 52Ra which face the rotor 40a. Further, the other ends of the iron pieces 50La and 50Ra are connected to each other. The iron pieces 50La and 50Ra are respectively provided with fitting holes 55La and 55Ra, which are respectively engaged with fixing pins 15La and 15Ra formed in the upper case 10a. The fixing pins 15La and 15Ra are provided near a stopper member 41a.

A coil bobbin 90a is assembled onto the iron pieces 50La and 50Ra. The coil bobbin 90a is made of a synthetic resin. As illustrated in FIGS. 8 and 9, the coil bobbin 90a includes: two arm portions around which the coils 70La and 70Ra are respectively wound; flange portions 91La and 92La provided at both ends of one of the two arm portions; and the flange portions 91Ra and 92Ra are provided at both ends of the other of the two arm portions. As illustrated in FIG. 9, the flange portions 91La and 91Ra are respectively provided with terminal portions 94La and 94Ra for respectively winding ends of the coils 70La and 70Ra. Herein, the coils 70La and 70Ra are composed of a single wire. This wire is connected to solder lands 81a and 82a formed on a FPC 80a, and is indicated by a dashed line in FIG. 8. Further, the coil bobbin 90a is provided with a thin portion 93a connecting the flange portions 92La and 92Ra. The thin portion 93a is thinner than other portions such as the flange portion 92La, and is bendable. The coil bobbin 90a is bended via the thin portion 93a such that the flange portions 92La and 92Ra are perpendicular to each other, as illustrated in FIGS. 8 and 9.

Figure 11:
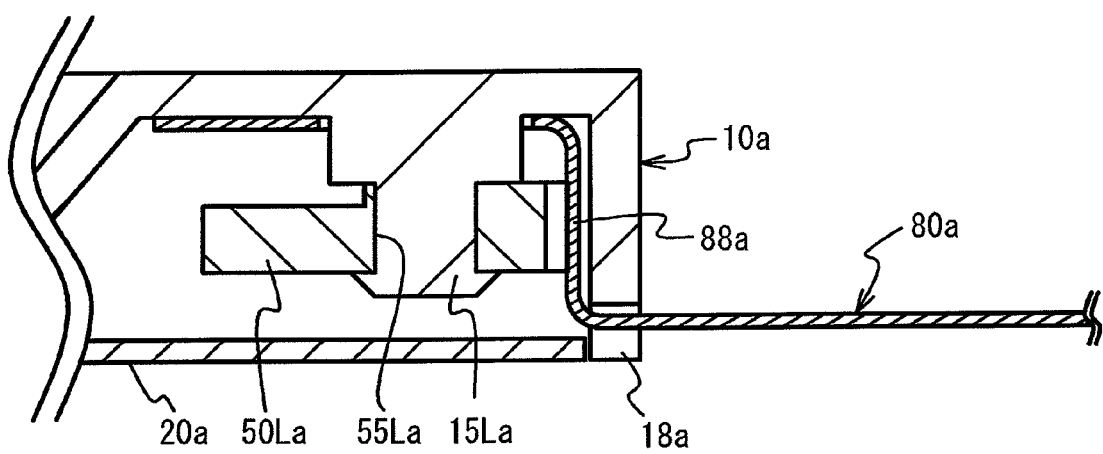
FIG. 11 is a cross-sectional view taken along a line D-D illustrated in FIG. 8.

Further, the FPC 80a is provided with a relief opening 86a for ensuring an optical path passing through the openings 11a and 21a, as illustrated in FIG. 8. The FPC 80a is provided with a relief opening 84a for preventing the interference with the rotation of the rotor 40a. The FPC 80a are provided with through holes 85La and 85Ra through which the fixing pins 15La and 15Ra are penetrated. FIG. 11 is a cross-sectional view taken along a line D-D illustrated in FIG. 8. As illustrated in FIG. 11, the FPC 80a is inserted into the upper and lower cases 10a and 20a via an insert hole 18a formed in the upper case 10a. The FPC 80a is bended at a bending portion 88a and arranged along the inner surface of the lower case 20a. Moreover, the solder lands 81a and 82a are arranged within the upper and lower cases 10a and 20a to be surrounded by the iron pieces 50La and 50Ra.

Further, as illustrated in FIG. 11, the fixing pin 15La is fitted into the fitting hole 55La formed in the iron piece 50La, an end portion of the fixing pin 15La is fixed in the upper case 10a by thermal caulking. This configuration also eliminates a positioning pin which abuts with the periphery of the stator, thereby maintaining the small sizes of the upper and lower cases 10a and 20a in the planar direction. Accordingly, the small size of the blade drive device in the planar direction can be maintained. Additionally, the fixing pin 15La may be press fitted into the fitting hole 55La. In this case, the iron piece 50La can be securely fixed to the upper case 10 with a desirable certain clearance between the iron piece 50La and the rotor 40a.

Furthermore, the blade 30a is fixed to the stopper member 41a, and the stopper member 41a is rotated in conjunction with the rotor 40a, as illustrated in FIG. 10. That is, the blade 30a is attached to the rotor 40a via the stopper member 41a. Also, referring to FIG. 10, thin portions 51La and 51Ra are formed on the connecting portions of the iron pieces 50La and 50Ra, respectively. Further, stage portions 16a and 26a for supporting this connecting portion are respectively formed in the upper and lower cases 10a and 20a. The stage portions 16a and 26a respectively abut with the upper surface of the thin portion 51La and the lower surface of the thin portion 51Ra. In addition, the coil bobbin 90a and the coil 70La are omitted in FIG. 10.

The blade 30a illustrated in FIG. 9 is positioned at a receded position in which the blade 30a is receded from the openings 11a and 21a. The blade 30a in the receded position is arranged to partially overlap the iron piece 50Ra in the optical path direction. In more details, the blade 30a is arranged between the iron piece 50Ra and the lower case 20a in the optical path direction. With such a configuration, the small size in the planar direction can be maintained. Furthermore, as illustrated in FIG. 9, both of the coils 70Ra and 70La are wound in such a position not to interfere with the blade 30a positioned at the receded position. Accordingly, the small size in the planar direction can be maintained.

Moreover, the coil bobbin 90a is bendable via the thin portion 93a, as mentioned above. Even when the stator has a rectangular shape in this manner, the coil can be wound around two sides, which do not oppose to each other, of the stator having the rectangular shape. Therefore, the number of the turns of the coil can be increased by means of the single coil bobbin 90a.

Figure 12:
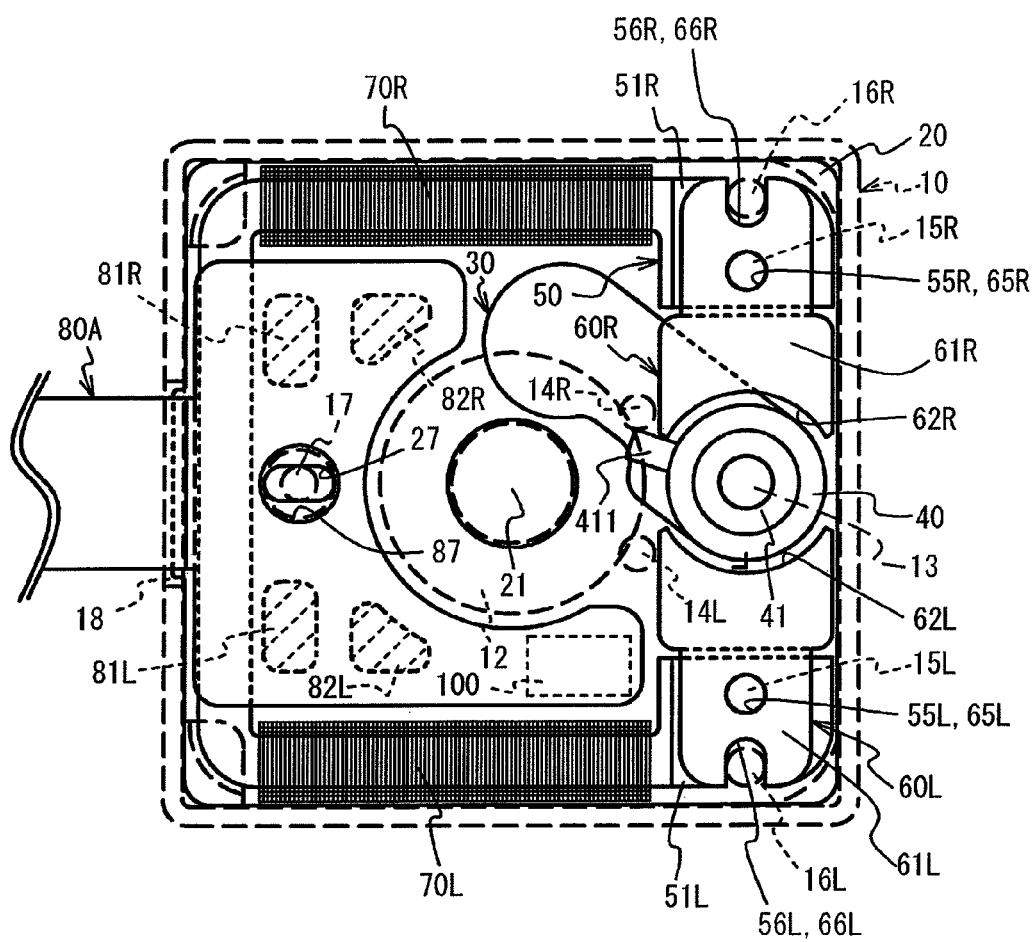
FIG. 12 is a front view of a variation of the blade drive device according to the first embodiment.

Next, a description will be given of a variation of the blade drive device according to the first embodiment with reference to FIG. 12. FIG. 12 is a front view of the variation of the blade drive device according to the first embodiment. FIG. 12 corresponds to FIG. 1. As illustrated in FIG. 12, a control IC 100, for controlling current in the coils 70L and 70R, is mounted on a FPC 80A. The control IC 100 is mounted on a surface, of the FPC 80A, facing the lower case 20. In this manner, the control IC 100 is also mounted to be surrounded by the iron pieces 50, 60L, and 60R, thereby improving the handling ability of the blade drive device. Also, the control IC 100 is housed within the upper and lower cases 10 and 20, thereby making the blade drive device and the control IC 100 into a single unit, and thereby making the handling of the blade drive device easy. Further, the space within an external device equipped with the blade drive device can be effectively used.

Figure 13:
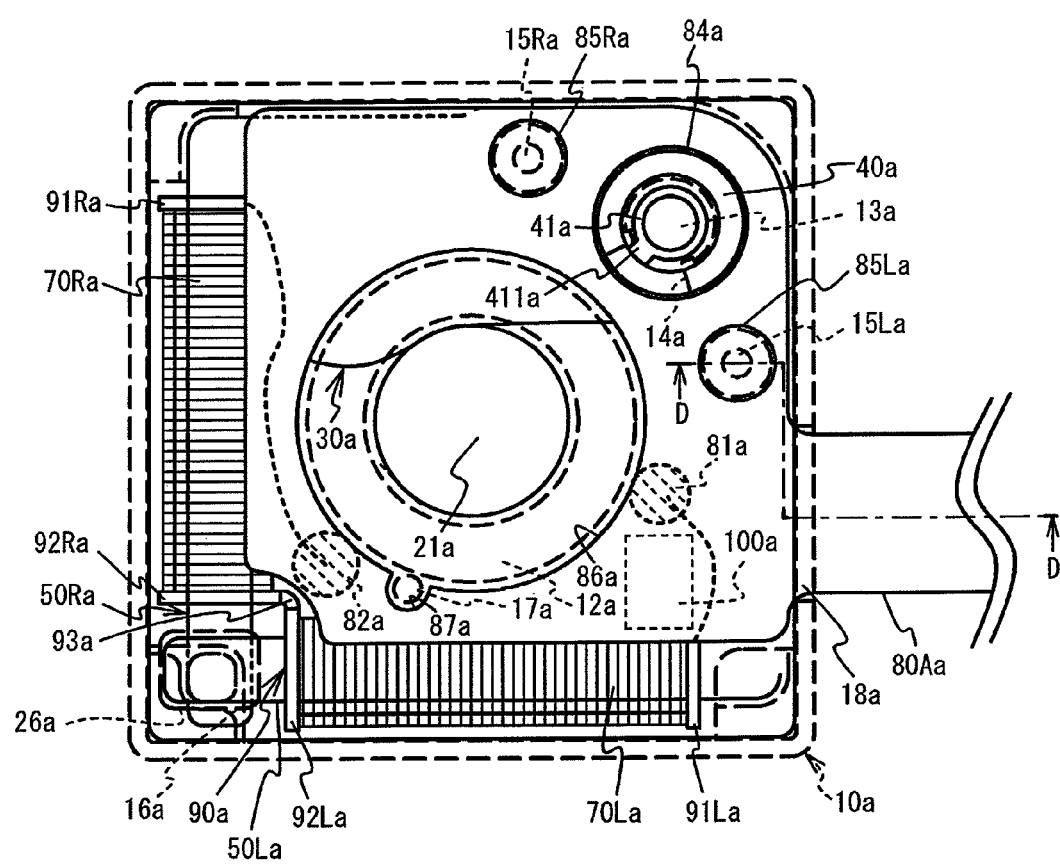
FIG. 13 is a front view of a variation of the blade drive device according to the second embodiment.

Next, a description will be given of a variation of the blade drive device according to the second embodiment with reference to FIG. 13. FIG. 13 is a front view of a variation of the blade drive device according to the second embodiment. FIG. 13 corresponds to FIG. 8. As illustrated in FIG. 13, a control IC 10a, for driving the rotor 40a, is mounted on a FPC 80Aa. The control IC 10a is also mounted on a surface, of the FPC 80Aa, facing a lower case 20a. With such a configuration, the handling ability of the blade drive device is also improved. Further, the blade drive device and the IC 100a can be integrated into a single unit, thereby making the handling of the blade drive device easy and effectively using space within an external apparatus equipped with the blade drive device.

While the preferred embodiments of the present invention have been illustrated in detail, the present invention is not limited to the above-mentioned embodiments, and other embodiments, variations and modifications may be made without departing from the scope of the present invention.

The blade defines the fully open and close states. However, the blade may adjust the opening rate of the opening. Plural blades may be provided.

The embodiments have illustrated the blade 30 made of a synthetic resin. However, the blade 30 may be made of a typically antireflective film of a light shielding film, like a somablack film (Somar Corporation), for example.

Additionally, plural motors may be provided. For example, as described in the second embodiment, when the two iron pieces each has a L shape, the two rotors are arranged on a diagonal line with the opening set as a center.

The second embodiment has illustrated the configuration in which the iron pieces 50La and 50Ra are supported by the stage portions 16a and 26a. However, a fixing pin formed in the upper case may be fitted into the fitting holes formed in the iron pieces 50La and 50Ra, and then an end portion of the fixing pin may be fixed to the fitting holes by thermal caulking. Alternately, by pressure fitting the fixing pin into the fitting hole, the iron pieces 50La and 50Ra may be securely fixed to the upper case.

The second embodiment has illustrated the terminal portions 94La and 94Ra, around which the end portions of the coils 70La and 70Ra are respectively wound, are provided in the flange portions 91La and 91Ra of the coil bobbin 90a, respectively. However, the coil bobbin without the terminal portions 94La and 94Ra may be employed.

Further, a sheet of a ND filter may cover the opening.

Finally, several aspects of the present invention are summarized as follows.

According to an aspect of the present invention, there is provided a blade drive device including: a blade; a drive source that drives the blade; and a chassis that has an opening opened and closed by the blade, and that houses the blade and the drive source, the drive source comprising: a rotor that is rotatably supported; and a stator around which a coil for excitation is wound and which applies a rotational force to the rotor, the stator being formed along an inner side surface of the chassis and having a rectangular shape.

With such a configuration, since the stator is formed along the inner side surface of the chassis housing the blade and the drive source, the handling ability can be improved when the blade drive device is assembled and installed into a mobile phone or the like.

In the above configuration, a thickness of the chassis may correspond to a thickness of the coil wound around the stator.

With such a configuration, since the thickness of the coil wound around the stator is the largest portion in the components constituting the blade drive device, the thickness of the chassis corresponds to that of the coil, thereby improving the handling ability and maintaining the reduced thickness in the optical axis direction.

In the above configuration, the blade drive device may include a print substrate having a terminal portion for energizing the coil, and a connecting portion of one end of the coil and the terminal portion may be housed within the chassis and may be surrounded by the stator.

With such a configuration, since the print substrate is housed within the chassis and is surrounded by the stator, the coil can be prevented from being broken in assembly or the like, and the handling ability is improved.

In the above configuration, the print substrate may be inserted into the chassis via a side surface of the chassis.

With such a configuration, the reduced thickness can be maintained in the optical direction.

In the above configuration, the blade may be attached to the rotor.

With such a configuration, since the blade is attached to the rotor, the number of the parts can be reduced while the reduced thickness is maintained in the optical axis direction.

In the above configuration, the chassis may include an upper case and a lower case that are separately provided in an optical path direction, the upper case and the lower case may be provided with a filling portion filled with an adhesive material for fixing the upper case and the lower case to each other.

With such a configuration, the reduced thickness can be maintained in the optical axis direction, as compared with a case where the upper case and the lower case are fixed by thermal caulking or the like.

In the above configuration, the chassis may include an upper case and a lower case, the upper case and the lower case may be provided with a snap fit engagement portion for fixing the upper case and the lower case to each other.

With such a configuration, the thickness can be also reduced in the optical axis direction.

In the above configuration, the stator may have a flat shape in the optical axis direction.

With such a configuration, the reduced thickness can be maintained in the optical axis direction.

In the above configuration, the stator may include a plurality of iron pieces mutually connected, and each of the plurality of iron pieces may have a thin portion thinner than another portion at a connecting portion where the plurality of iron pieces are connected to each other.

With such a configuration, since the thin portions of the plural iron pieces are mutually connected, the reduced thickness can be maintained in the optical axis direction.

In the above configuration, the chassis and the stator each may have a rectangular shape when viewed in the optical axis direction.

With such a configuration, the space is effectively used as compared with a blade drive device having a circular shape when viewed in the optical axis direction, and the handling is facilitated after assembly is finished.

In the above configuration, a controller IC may be mounted on the print substrate, and the controller IC may be housed in the chassis and may be surrounded by the stator.

With such a configuration, the blade drive device and the controller IC are united, so that the handling thereof can be facilitated, and a space within an external apparatus equipped with the blade drive device can be effectively used.

What is claimed is:

1. A blade drive device comprising:
   a blade;
   a drive source that drives the blade; and
   a chassis that has an opening opened and closed by the blade, and that houses the blade and the drive source,
   the drive source comprising:
   a rotor that is rotatably supported;
   a stator, having a flat shape in an optical axis direction, around which a coil for excitation is wound and which applies a rotational force to the rotor, the stator, surrounding an axis of the opening, being formed along an inner side surface of the chassis and having a rectangular shape, wherein a thickness of the chassis corresponds to a thickness of the coil wound around the stator, the stator comprising a plurality of iron pieces of an identical shape mutually connected, and each of the plurality of iron pieces has a thin portion thinner than another portion at a connecting portion where the plurality of iron pieces are connected to each other, with the than portions in contact with each other, and
   a print substrate having a terminal portion for energizing the coil,
   wherein a connecting portion of one end of the coil and the terminal portion are housed within the chassis and are surrounded by the stator.

2. The blade drive device of claim 1, wherein the print substrate is inserted into the chassis via a side surface of the chassis.

3. The blade drive device of claim 1, wherein the blade is attached to the rotor.

4. The blade drive device of claim 1, wherein the chassis includes an upper case and a lower case that are separately provided in an optical path direction, the upper case and the lower case are provided with a filling portion filled with an adhesive material for fixing the upper case and the lower ease to each other.

5. The blade drive device of claim 1, wherein the chassis includes an upper case and a lower case, the upper case and the lower case are provided with a snap fit engagement portion for fixing the upper case and the lower case to each other.

6. The blade drive device of claim 1, wherein the chassis and the stator each have a rectangular shape when viewed in the optical axis direction.

7. The blade drive device of claim 1, wherein a controller IC is mounted on the print substrate, and the controller IC is housed in the chassis and is surrounded by the stator.

8. A blade drive device comprising:
a blade;
a drive source that drives the blade; and
a chassis that has an opening opened and closed by the blade, and that houses the blade and the drive source,
the drive source comprising:
a rotor that is rotatably supported;
a stator, having a flat shape in an optical axis direction, around which a coil for excitation is wound and which applies a rotational force to the rotor, the stator, surrounding an axis of the opening, being formed along an inner side surface of the chassis and having a rectangular shape, wherein a thickness of the chassis corresponds to a thickness of the coil wound around the stator, the stator comprising a plurality of iron pieces of an identical shape mutually connected, and each of the plurality of iron pieces has a thin portion thinner than another portion at a connecting portion where the plurality of iron pieces are connected to each other, with the thin portions in contact with each other, and
a print substrate having a terminal portion for energizing the coil,
wherein a connecting portion of one end of the coil and the terminal portion are housed within the chassis and are surrounded by the stator, wherein
the iron pieces includes: a first iron piece having a substantially U shape; and
second and third iron pieces respectively connected to an end and another end of the first iron piece and facing the rotor;
each of the first, second, and third iron pieces has a thin portion thinner than another portion;
the thin portion of the first iron piece includes a first thin portion and a second thin portion;
the first thin portion of the first iron piece is in contact with the thin portion of the second iron piece; and
the second thin portion of the first iron piece is in contact with the thin portion of the third iron piece.

* * * * *